L. L. KNOX.
REVERSING REGENERATIVE FURNACE.
APPLICATION FILED MAY 16, 1913.

1,085,139.

Patented Jan. 27, 1914.

3 SHEETS—SHEET 1.

WITNESSES

INVENTOR
L. L. Knox

L. L. KNOX.
REVERSING REGENERATIVE FURNACE.
APPLICATION FILED MAY 16, 1913.
1,085,139.
Patented Jan. 27, 1914.
3 SHEETS—SHEET 2.
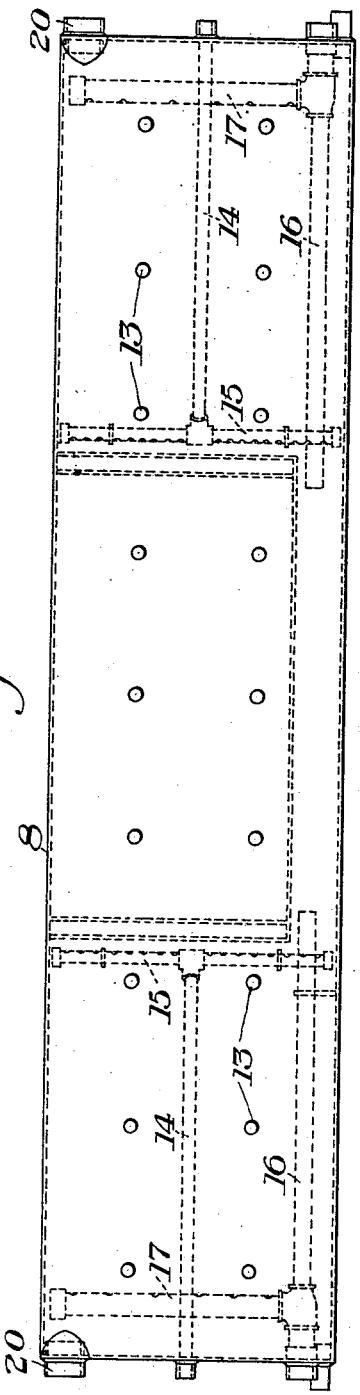
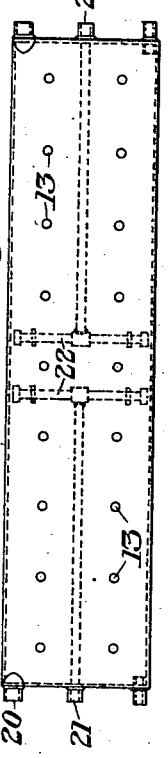
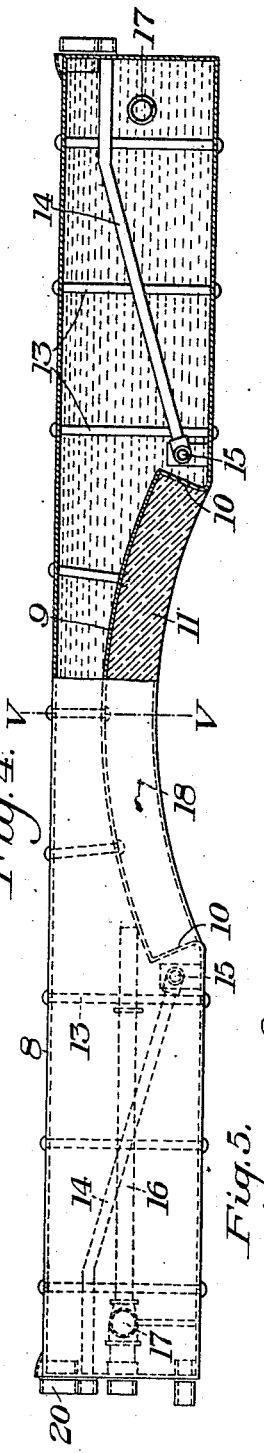
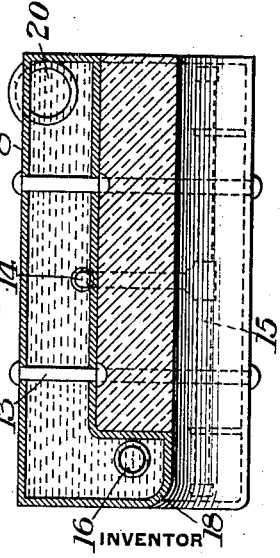

L. L. KNOX.
REVERSING REGENERATIVE FURNACE.
APPLICATION FILED MAY 16, 1913.
1,085,139.
Patented Jan. 27, 1914.
3 SHEETS—SHEET 3.
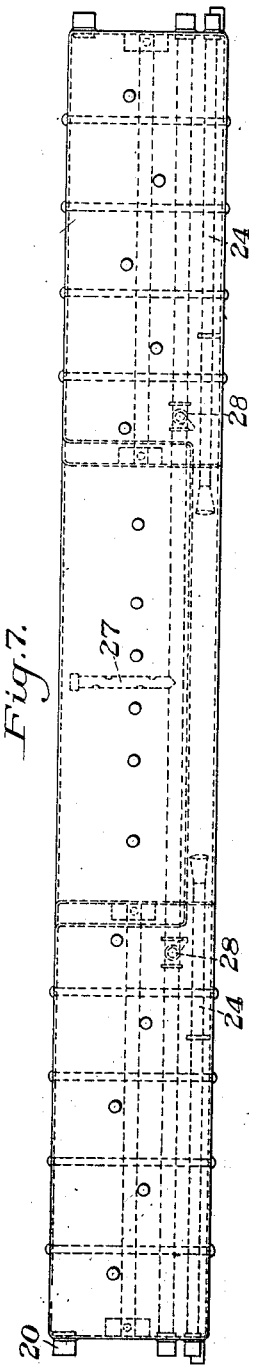
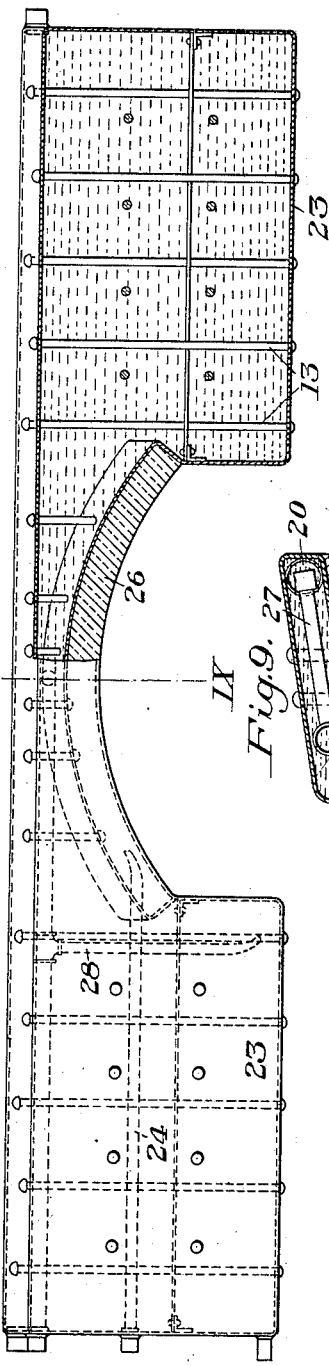
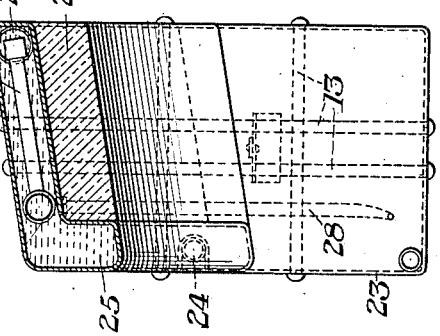

UNITED STATES PATENT OFFICE.

LUTHER L. KNOX, OF AVALON, PENNSYLVANIA, ASSIGNOR TO KNOX PRESSED & WELDED STEEL COMPANY, OF PITTSBURGH, PENNSYLVANIA, A CORPORATION OF PENNSYLVANIA.

REVERSING REGENERATIVE FURNACE.

1,085,139. Specification of Letters Patent. Patented Jan. 27, 1914.

Application filed May 16, 1913. Serial No. 768,024.

*To all whom it may concern:*

Be it known that I, LUTHER L. KNOX, a citizen of the United States, residing at Avalon, in the county of Allegheny and State of Pennsylvania, have invented a new and useful Improvement in Reversing Regenerative Furnaces, of which the following is a full, clear, and exact description, reference being had to the accompanying drawings, forming part of this specification, in which—

Figure 1:
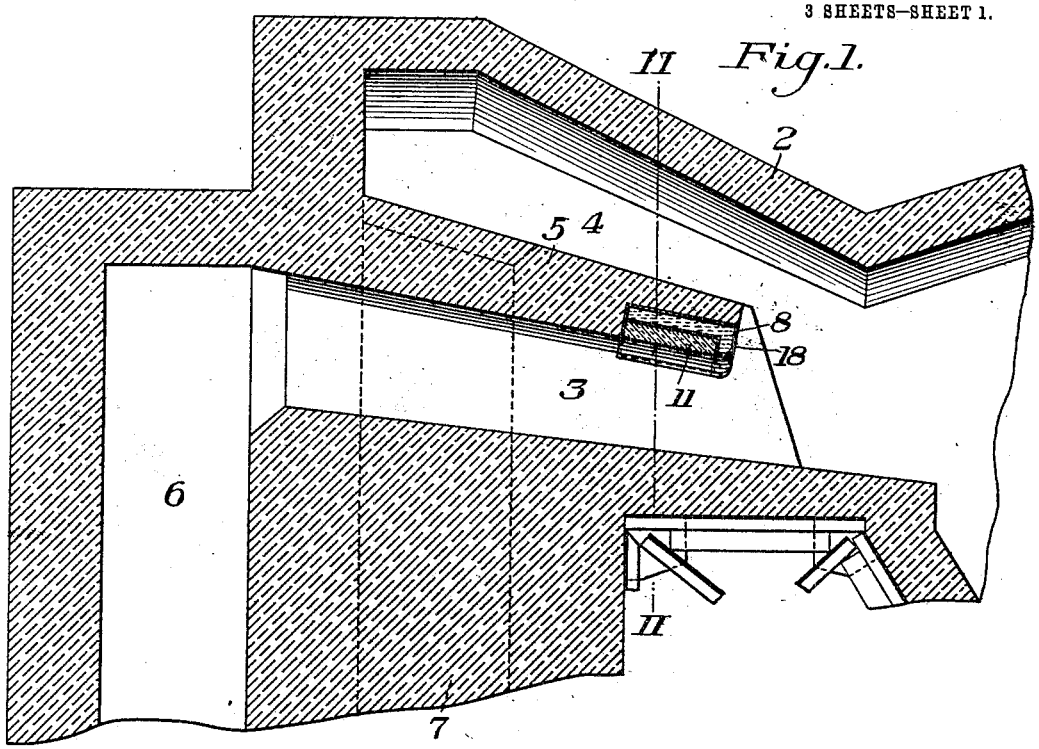
Figure 2:
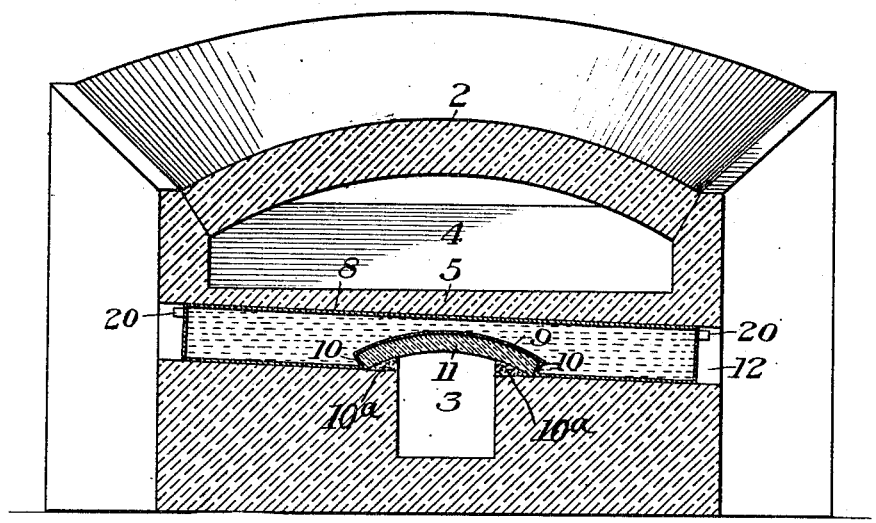

Figure 1 is a vertical section of a portion of the masonry work of one end portion of an open hearth furnace, showing my invention applied thereto; Fig. 2 is a cross section of the same, on the line II—II of Fig. 1; Fig. 3 is a plan view of the cooling box removed; Fig. 4 is a front view of the same, partly in section; Fig. 5 is a section on the line V—V of Fig. 4; Fig. 6 is a plan view of a preferable form of cooling box; Fig. 7 is a plan view showing another modified form; Fig. 8 is a view partly in front elevation and partly in vertical section of the cooling box shown in Fig. 7; and Fig. 9 is a section on the line IX—IX of Fig. 8.

My invention has relation to reversing regenerative furnaces, and is designed to provide means of novel and effective character for cooling and protecting the wall or arch separating the gas and air ports of the furnace.

The nature of my invention will be best understood by reference to the accompanying drawings, showing several different embodiments of my invention, which will now be described.

Referring first to that form of my invention shown in Figs. 1 to 5, inclusive, the numeral 2 designates the masonry work of one end portion of an open hearth furnace of the reversing regenerative type. 3 designates one of the gas ports of the furnace; 4 the air port above the gas port; 5 the wall of refractory material separating the two ports; 6 the gas uptake; and 7 one of the air uptakes. These ports are, in general, of well known character and need not be described in detail. The numeral 8 designates a cooling box which extends through the refractory wall 5 over the nose portion of the gas port 3. This box is of elongated general rectangular form and extends across the major portion of the total width of the furnace, as shown in Fig. 2. At its central portion immediately over the gas port 3, it is formed with an upward and inwardly offset arched portion 9, having the skew backs 10 which support an arch 11 of refractory material, which forms the immediate roof of this portion of the gas port. To receive this box, the furnace is provided with a transversely extending opening 12, which preferably extends entirely through the furnace from side to side, as shown in Fig. 2. The box is preferably formed of sheet metal plates suitably welded at their joints and connected by the stay bolts 13. To facilitate the insertion and removal of the box with a minimum disturbance of the furnace structure, the spaces at each side of the port 3 immediately underneath the refractory arch 11, may be filled with plastic material after the box has been inserted, as indicated at 10ª in Fig. 2. In removing the box, if this material has not already burned away, it can be readily broken off. Any suitable system of connections may be provided for maintaining a water circulation within the box. In the drawings, I have shown a water supply pipe 14, extending into the box at each end portion thereof and terminating at its inner end in a transverse pipe 15, formed with a plurality of discharge perforations. These transverse pipes 15 are at either side of the arch portion 9 and preferably are arranged so as to discharge the water directly against the skew backs 10. I also show the box as provided with a second set of water inlet pipes 16, one of which extends into each end of the box with a transverse discharge arm 17, near the outer end of the box and having its inner end arranged to discharge directly from the end portion of the arch. In order to protect the front edge or nose of the refractory arch 11 from direct contact with the gases, the box is provided with a downwardly extending hollow lip 18, which covers and protects this edge. The box is preferably somewhat inclined down from one end toward the other, as shown in Fig. 2, in order to provide for the ready escape of steam from its upper corner portion. The box is preferably provided with an outlet connection 20, at each end, one of these connections communicating directly with the steam space which is provided by reason of this inclination of the box.

In the modification shown in Fig. 6, the cooling box 8ª, is in the same general form as that shown in Figs. 1 to 5, except that the arch portion 9 with its skew backs is omitted, and the box is formed with parallel upper and lower surfaces throughout its length. This will appear by reference to Fig. 6, which may be taken either as a top or a bottom plan view of this form of the invention. In this form, I have shown the box as having two of the pipes 21 extending therein from opposite ends and terminating near the center of the box in transverse discharge arms 22.

In Figs. 7, 8 and 9, I have shown another modification in which the cooling box is of the same general character as that shown in Figs. 1 to 5, but has its end portions extending downwardly, as shown at 23, at each side of the gas port so as to form water-cooled side walls for said port. In this form, the box is provided with two inlet pipes 24, which extend therein from opposite ends and are arranged to discharge directly into the depending flange 25, at the front end of the refractory arch 26. It is also provided with another water inlet pipe extending from end to end and having a central discharge branch 27, over the arch, and two downwardly extending branches 28, which discharge adjacent to the inner end wall of the extensions 23.

My invention provides port-cooling means for furnaces of this type which can be readily inserted into and removed from the furnace, and which provides for keeping a relatively large body of cooling water above and at each side of the upper portion of the gas port. The effect of this body of water (which may be circulated as rapidly as necessary in order to maintain its temperature at a proper degree) is that that portion of the wall of the gas port which tends to most rapidly cut away by the action of hot gases, is efficiently protected. This protection is afforded in such a manner as to prevent a too great cooling of the furnace gases due to direct contact with water-cooled surfaces. It will be noted that (with the exception of the form shown in Fig. 6, in which a refractory lining may or may not be placed underneath the cooling box from the gas port) the hot gases do not come into direct contact with the cooling box at any point.

I claim:

1. The combination with a furnace having gas and air ports and a refractory wall separating said ports, of a hollow unitary cooling box extending transversely of said wall across more than one-half the width of the furnace, the central portion of said box lying above the nose end of the gas port and forming the only connection between the end portions of the box, said box being insertible and removable from the side of the furnace, and forming means to provide for the presence of a relatively large unitary body of cooling liquid within that portion of the furnace which the box occupies; substantially as described.

2. The combination with a furnace having gas and air ports and a refractory wall separating said ports, of a hollow cooling box extending transversely of said wall and across the major portion of the width of the furnace, said box being insertible and removable from the side of the furnace and its end portions being connected only by a portion thereof which extends over the gas port, and said portion having supporting means for an arch portion of said refractory wall, substantially as described.

3. The combination with a furnace having gas and air ports and a refractory wall separating said ports, of a hollow cooling box extending transversely of said wall and across the major portion of the width of the furnace, said box being inclined downwardly from one end toward the other, substantially as described.

4. The combination with a furnace having gas and air ports and a refractory wall separating said ports, of a hollow cooling box extending transversely of said wall and across the major portion of the width of the furnace, said box being insertible and removable from the side of the furnace and its end portions being connected only by a portion thereof which extends over the gas port, and said portion having supporting means for an arch portion of said refractory wall, and the box also having a depending hollow flange abutting and protecting the front edge of said arch, substantially as described.

5. The combination with a furnace having gas and air ports and a refractory wall separating said ports, of a hollow cooling box extending transversely of said wall and across the major portion of the width of the furnace, said box being insertible and removable from the side of the furnace and its end portions being connected only by a portion thereof which extends over the gas port, and said portion having supporting means for an arch portion of said refractory wall, together with water supply pipes extending into said box from each end thereof and discharging adjacent to its central portion, substantially as described.

6. The combination with a furnace having gas and air ports and a refractory wall separating said ports, of a hollow unitary cooling box extending transversely of said wall across more than one-half the width of the furnace, the central portion of said box lying above the nose end of the gas port and forming the only connection between the end portions of the box, said box being insertible and removable from the side of the furnace, and forming means to provide for the presence of a relatively large unitary body of cooling liquid within that portion of the furnace which the box occupies, and the ends of the box having means for connecting circulating pipes thereto for said liquid; substantially as described.

In testimony whereof, I have hereunto set my hand.

LUTHER L. KNOX.

Witnesses:
R. A. BALDERSON,
H. M. CORWIN.